United States Patent [19]
Fulton

[11] 3,938,641
[45] Feb. 17, 1976

[54] CONTROL SYSTEM FOR HIGH SPEED PRINTER

[75] Inventor: John R. Fulton, Brookfield, Ill.

[73] Assignee: Extel Corporation, Northbrook, Ill.

[22] Filed: May 7, 1975

[21] Appl. No.: 575,370

Related U.S. Application Data

[63] Continuation-in-part of Ser. No. 349,438, April 9, 1973, abandoned, and a continuation of Ser. No. 528,447, Nov. 29, 1974.

[52] U.S. Cl. ............................ 197/1 R; 340/172.5
[51] Int. Cl.² .................................... B41J 25/00
[58] Field of Search .............. 197/1 R, 49, 55, 48; 340/172.5; 178/30, 23 R, 24, 23 A, 26 R, 26 A; 101/93.15, 93.04, 93.05

[56] References Cited
UNITED STATES PATENTS

| | | | |
|---|---|---|---|
| 3,353,648 | 11/1967 | Amada et al. | 197/55 |
| 3,363,238 | 1/1968 | Clark et al. | 178/23 X |
| 3,668,652 | 6/1972 | Zahn | 340/172.5 |
| 3,670,861 | 6/1972 | Zenner et al. | 197/1 R X |
| 3,703,949 | 11/1972 | Howard et al. | 197/1 R |
| 3,719,781 | 3/1973 | Fulton et al. | 178/30 |
| 3,761,880 | 9/1973 | Kritz et al. | 340/172.5 |

*Primary Examiner*—Edgar S. Burr
*Assistant Examiner*—R. T. Rader
*Attorney, Agent, or Firm*—Kinzer, Plyer, Dorn & McEachran

[57] ABSTRACT

An all-electronic control system for a high-speed column sequential dot matrix printer, using a permutation code signal of given pulse rate $p$ comprising a series of individual code words each including a fixed number of data pulses preceded by a start pulse; the control system comprises a plural-stage FIFO storage register with a capacity of at least three, and preferably four or more, code words, for storing input data, as during a carriage return of the printer. A print timing oscillator having a frequency $f$ is coupled to countdown means that develops a normal print rate signal $f/n$ and a fast print rate signal $f/m$, where $f >> p$ and $n > m$. A print rate selector selects one of the print rate signals, to control the printing speed of the printer, depending on whether a code word is stored in a given stage of the storage register.

13 Claims, 9 Drawing Figures

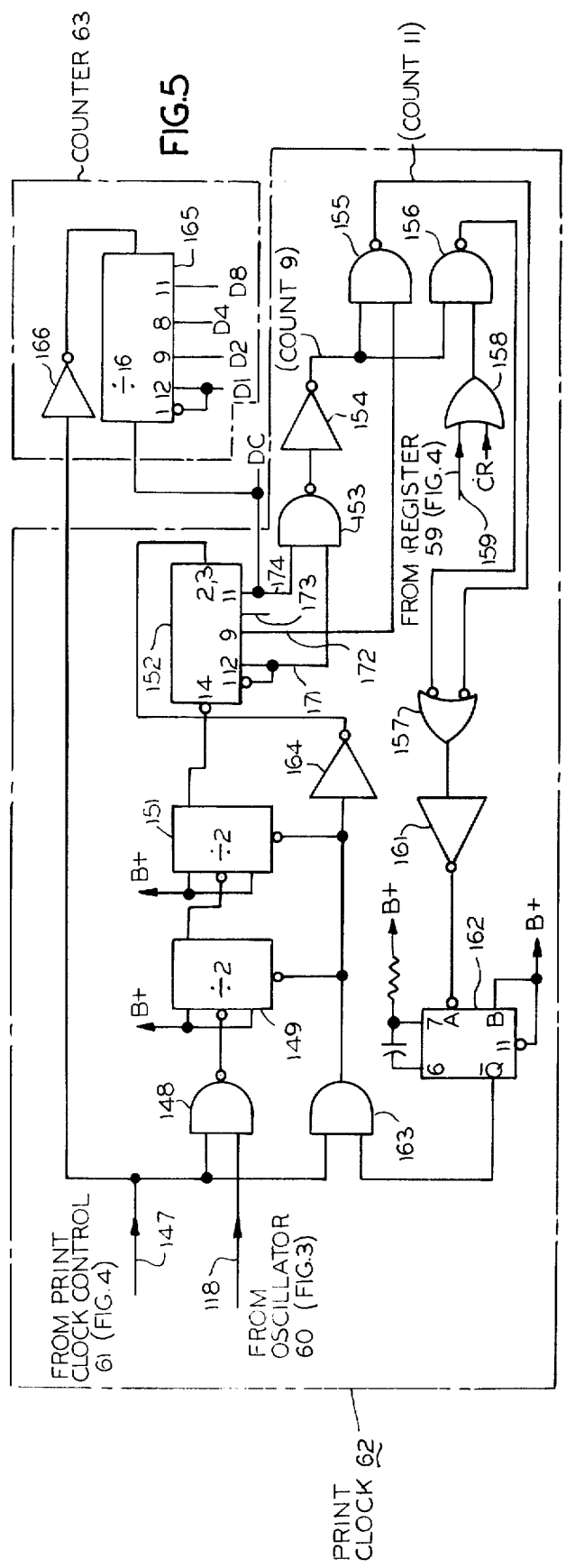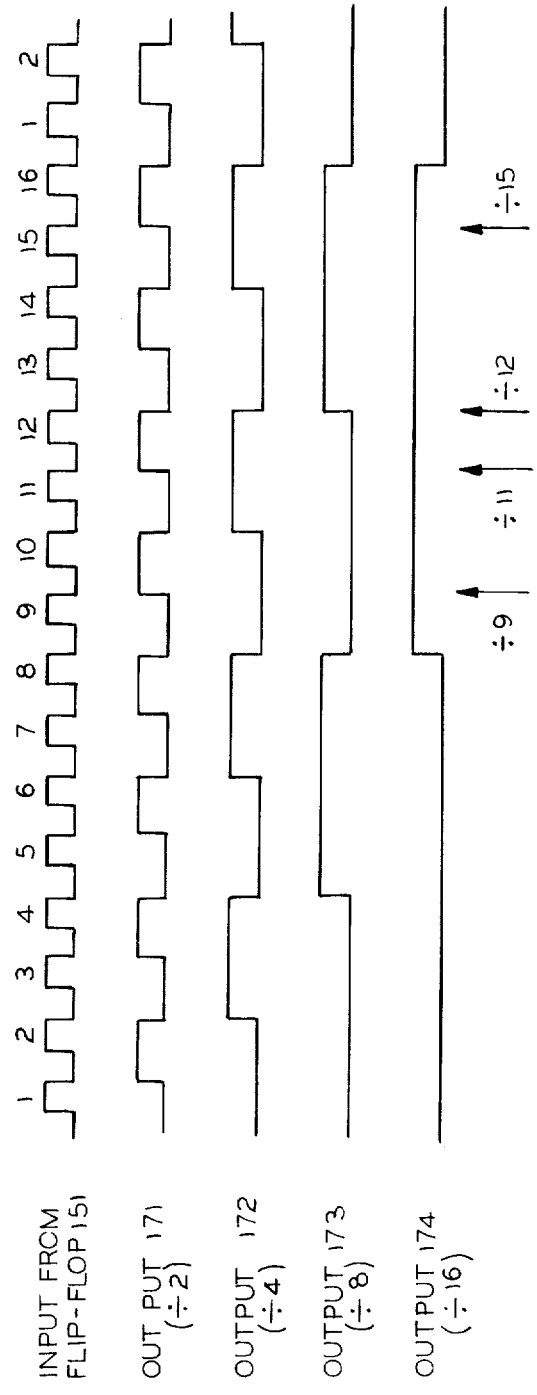

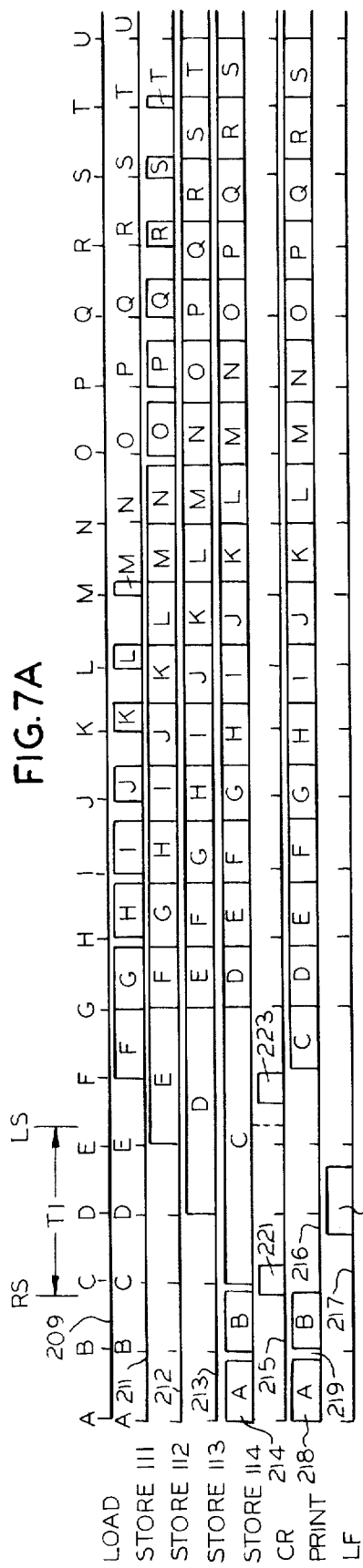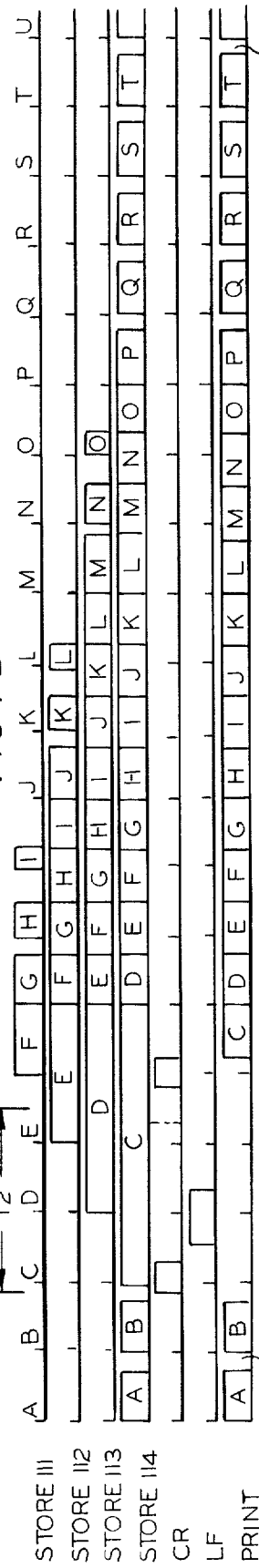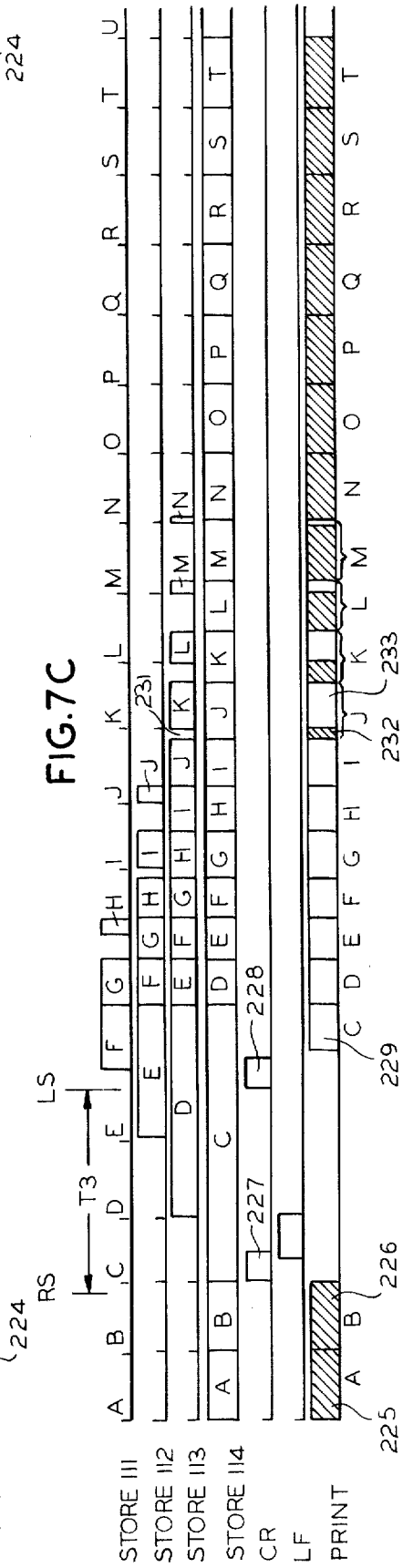

CONTROL SYSTEM FOR HIGH SPEED PRINTER

CROSS REFERENCE TO RELATED APPLICATIONS

This application is a continuation-in-part of application Ser. No. 349,438 filed Apr. 9, 1973 now abandoned, and is a continuation of application Ser. No. 528,447 filed Nov. 29, 1974.

The invention covered by this application is an improvement upon the control system described and claimed in U.S. Pat. No. 3,719,781 of Walter J. Zenner and John R. Fulton for Control System for High Speed Printer, and is particularly applicable to a printer of the kind described and claimed in U.S. Pat. No. 3,670,861 of Walter J. Zenner and Raymond Kranz.

BACKGROUND OF THE INVENTION

The basic timing requirements for operation of a high-speed printer controlled by a permutation code data input signal, such as the conventional seven and one-half unit Baudot code or the American Standard Code for Information Interchange (ASCII), are established by the received signal. In a dot matrix printer, particularly the kind in which each character is reproduced in a series of individual columns of dots imprinted sequentially, timing of the printer operations is quite critical. Each code word, as received, must be translated into a form usable in control of the printer, and the translated information must be presented to the printer with precise timing and at a speed sufficient to permit multiple functions of the printer mechanism before a new code word is received. Conventional timing controls have not been notably efficient, as applied to high-speed column-sequential dot matrix printers, leading to continuing difficulties in maintaining accurate character reproduction.

These timing difficulties are accentuated in connection with non-print functions of the printer, particularly the carriage return and line feed operations. Immediate recognition of a non-print function is essential to accurate operation of the printer; if the printer begins to step through a character-reproduction cycle in response to a non-print function code word, an error of substantial magnitude can result. Overprinting, distorted characters, erroneous characters and other errors can easily result from any discrepancies in timing or in code recognition.

In a printer operated at moderate speeds, of the order of five to ten characters per second, carriage return and line feed operations can be accommodated by storing code words received during the time intervals required for these operations. To avoid loss of characters or other data, the printing speed is increased somewhat, over the receiving rate, to assure complete reproduction of all incoming information. This usually results in some "dead" time in each character-printing cycle whenever the storage register has been cleared, which presents no particular operational problems at low or moderate speeds.

If the printer speed is increased, however, to a range of fifteen to thirty characters per second, a number of problems are encountered. At these higher speeds, one or more characters may be lost during a carriage return or line feed operation if the printer does not print rapidly enough to empty the storage register in time to accept further input data. This problem can sometimes be alleviated by increasing the input storage capacity. Another and more difficult problem, however, is presented by the fact that it becomes necessary to print each character faster than received. As a consequence, whenever the input store is cleared the printer operates with a carriage motion that prints one character, waits for the next character, prints the next character, and so on. The resulting dead time in each character printing cycle produces a start-stop motion which is intolerable at high printing speeds because the natural resonance of the carriage and associated components is approached, causing severe vibration and bouncing of the carriage. The overall result is often an unacceptable degradation in the quality of the printed copy.

SUMMARY OF THE INVENTION

It is a principal object of the invention, therefore, to provide a new and improved timing control for a high-speed column-sequential dot matrix printer actuated by a conventional permutation code input signal that effectively utilizes two or more different printing speeds, including a normal speed approximately matched to the pulse rate of the incoming data and a higher speed that is employed following a carriage return, line feed, or other operation in which some of the incoming data is placed in storage.

A specific object of the invention is to provide a smooth transition, from one printing speed to another, in the operation of a high-speed column-sequential dot matrix printer, to avoid excessive vibration of the printer while performing a catch-up operation to print characters that have had to be stored during a carriage return or similar operation.

An additional object of the invention is to provide a dual printing speed control system for a high-speed column-sequential dot matrix printer that is actuated in accordance with the storage condition of a given stage in an input storage register capable of storing at least three complete code words.

Accordingly, the invention relates to an electronic control system for controlling a high speed column-sequential dot matrix printer in accordance with a permutation code signal of given pulse rate in which each code word, representative of a character to be reproduced or of a non-print function, includes a given number of data pulses. The control system comprises a print timing oscillator having an operating frequency $f$ that is much higher than the pulse rate of the permutation code signal and is preferably an integral multiple of the permutation code pulse rate. The system further comprises a FIFO storage register including at least three stages, each stage having a capacity sufficient to record a complete code word. Means are provided for recording each code word in the storage register and for reading out each code word from the register, in the order received. A first countdown means, coupled to the oscillator, develops both a normal print rate signal having a frequency $f/n$; a second countdown means, coupled to the oscillator, develops a fast print rate signal having a frequency $f/m$; $n$ and $m$ are both integers and $n$ is larger than $m$. The system further includes print rate selection means for selecting one of the print rate signals to be supplied to the printer to control its printing speed, selection being made in accordance with the presence or absence of a code word stored in a given stage of the storage register.

BRIEF DESCRIPTION OF THE DRAWINGS

FIG. 5 is a detail schematic diagram of a print clock constructed in accordance with one embodiment of the present invention;

FIG. 6 is a timing chart illustrating a part of the operation of the control system illustrated in FIGS. 4 and 5; and FIGS. 7A through 7C are timing charts affording a comparison between operation of the system of the invention and previously known control systems.

DESCRIPTION OF THE PREFERRED EMBODIMENTS

Figure 1:
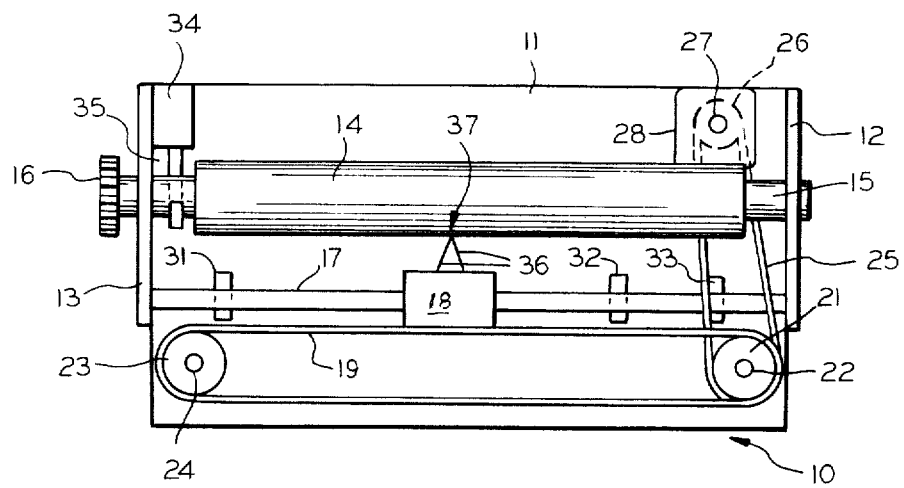
FIG. 1 is a simplified plan view of a high speed dot matrix printer of the general kind to which the control system of the present invention may be applied.
Figure 2:
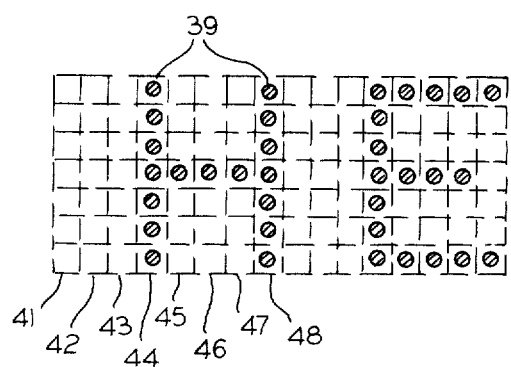
FIG. 2 illustrates the form of the characters printed by the printer of FIG. 1.

FIG. 1 illustrates, in simplified form, a high speed printing machine 10 in which the control system of the present invention may be employed; the printer 10 produces characters in dot matrix form as shown in FIG. 2. Printer 10 comprises a base 11 with two vertical frame members 12 and 13 affixed to the opposite sides of the base. A platen 14 is mounted upon a rotatable shaft 15 that extends between the two side frame members 12 and 13. A knob 16 is mounted on one end of shaft 15 to provide for manual rotation of the platen.

A carriage guide rail 17 is mounted at the front end of printer 10, extending transversely of the printer parallel to platen 14. A carriage 18 is mounted upon guide rail 17 and is connected to a carriage positioning belt 19. Preferably, belt 19 is a toothed belt of the kind known as a timing belt. Belt 19, at its right-hand end, extends around a drive sprocket 21 mounted upon a shaft 22 that projects upwardly from base 11. The other end of belt 19 engages an idler sprocket 23 mounted upon a vertical shaft 24 at the left-hand side of the printer base.

Shaft 22 is connected to a pulley, not shown, that is engaged by a drive belt 25. The drive belt 25 extends around a drive sprocket 26 mounted upon the shaft 27 of stepping motor 28. Motor 28 is a reversible motor that rotates through a discrete angle of rotation each time an electrical signal pulse is applied to the windings of the motor.

There are three control switches 31, 32 and 33 mounted on base 11 in position to be actuated by engagement with carriage 18. Switch 31 is located at the left-hand side of printer 10 and constitutes a left-hand margin control switch. Switch 33 is located at the right-hand side of the printer and comprises a right-hand margin control switch. Switch 32 is located intermediate switches 31 and 33, but substantially nearer to switch 33, and may be utilized for control of the right-hand margin, during printing operations, for material that has not been grouped in specific line groupings.

Printer 10 also includes a line feed actuator 34 mounted in the rear left-hand corner of the printer on base 11. Actuator 34, which may comprise a solenoid or a stepping motor, is connected to a line feed linkage 35 for rotating platen 14 through a discrete angular distance to achieve a line feed operation. In operation, a sheet or web of paper extends around platen 14 and is imprinted by impact from a plurality of printing rods or needles 36 that extend from carriage 18 toward platen 14. In a typical printer, there are seven rods 36 arranged in vertical alignment with each other at the printing station 37 adjacent the surface of platen 14, each provided with an individual drive magnet (not shown).

Printer 10 is, essentially, a simplified illustration of the high speed printer described and claimed in U.S. Pat. No. 3,670,861 of Walter J. Zenner and Raymond E. Kranz, issued June 20, 1972, to which reference may be made for a more complete and comprehensive description of the mechanical construction and operation of the printer. Details of some of the mechanical linkages in the printer, such as a return spring for return of carriage 18 to the left-hand margin and a clutch to release the carriage drive for return movement, have been omitted as unnecessary for an understanding of the present invention. The preferred construction for carriage 18, including print rods 36 and the print rod magnets, is described and illustrated in detail in U.S. Pat. No. 3,729,079 of Messrs. Zenner and Kranz, issued Apr. 24, 1973. Only a brief description of the mechanical operation of printer 10 is necessary in this specification.

In the operation of printer 10, as noted above, a sheet or web of impact-sensitive paper is extended around platen 14, between the platen and the print rods 36 of the printer. If preferred, ordinary paper and a carbon ribbon or carbon sheet can be employed. The starting position for carriage 18 is at the left-hand end of its travel on guide 17, adjacent the left-hand margin switch 31. For the first character to be imprinted, such as the character H illustrated in FIG. 2, carriage 18 advances P discrete steps from left to right, the carriage being driven by its positioning belt 19 through the drive afforded by stepping motor 28, drive belt 25, and sprocket 21; in the illustrated embodiment, $P = 8$. During the first three steps or column movements of carriage 18, no impression is made on the paper. In the next five steps of the carriage, the complete character is imprinted by selective actuation of rods 36.

As shown in FIG. 2, the initial advancing movement of carriage 18 leaves three blank columns 41, 42 and 43 preceding the first character to be imprinted. In the first character column 44, all seven of the print rods 36 are driven into impact with the paper, producing seven vertical dot impressions 39. On the next incremental step in the advancing movement of carriage 18, only one dot impression 39 is formed, at the fourth or center level. This action is repeated in the next two columns 46 and 47 in the advancing movement of carriage 18. In the eighth step of carriage 18, all seven of the print rods 36 are again actuated, producing seven dot impressions in the final column 48. This results in formation of the letter H as illustrated in FIG. 2. In this same manner, a complete line of characters is imprinted across the paper on platen 14, with carriage 18 moving from left to right a total of eight steps for each individual character.

As carriage 18 approaches the right-hand end of platen 14, it first engages switch 32. Switch 32 may be utilized to actuate a return mechanism (not shown) to return carriage 18 to the left-hand side of printer 10 and initiate printing of a new line. Under other operational circumstances, discussed more fully hereinafter, carriage 18 may continue its movement until it engages switch 33, at which time the carriage return and line feed mechanisms of printer 10 are mandatorily actuated to return the carriage to the initial line position and to feed the paper. Before a new line of print is initiated, actuator 34 rotates platen 14 through one or more feed increments, aligning a fresh line segment of the paper web with carriage 18.

In the preferred form of printer, the carriage return operation is effected by reverse rotation of motor 28 through a discrete number of steps, which reverse movement operates a spring-return mechanism that performs the necessary carriage return operation. In the carriage drive for the printer described in the aforementioned Zenner and Kranz U.S. Pat. No. 3,670,861, the carriage return action is initiated by reverse rotation of motor 28 through four steps, but a different number of reverse rotational steps for initiation of a carriage return could be employed if desired.

Ordinarily, each carriage return operation is initiated by a carriage return function code incorporated in a telegraph signal that controls printer 10. On the other hand, if the telegraph signal does not include suitable carriage return codes, the control system described in the aforementioned Fulton and Zenner U.S. Pat. No. 3,719,781 can be utilized to effectuate a carriage return operation upon the occurrence of any space code after carriage 18 has actuated switch 32, thus affording an automatic carriage return and line feed operation. A separate line feed code is utilized to actuate the line feed mechanism comprising solenoid 34 and linkage 35. Other non-print function codes may be included in the received signal and can be utilized in control of printer 10.

Figure 3:
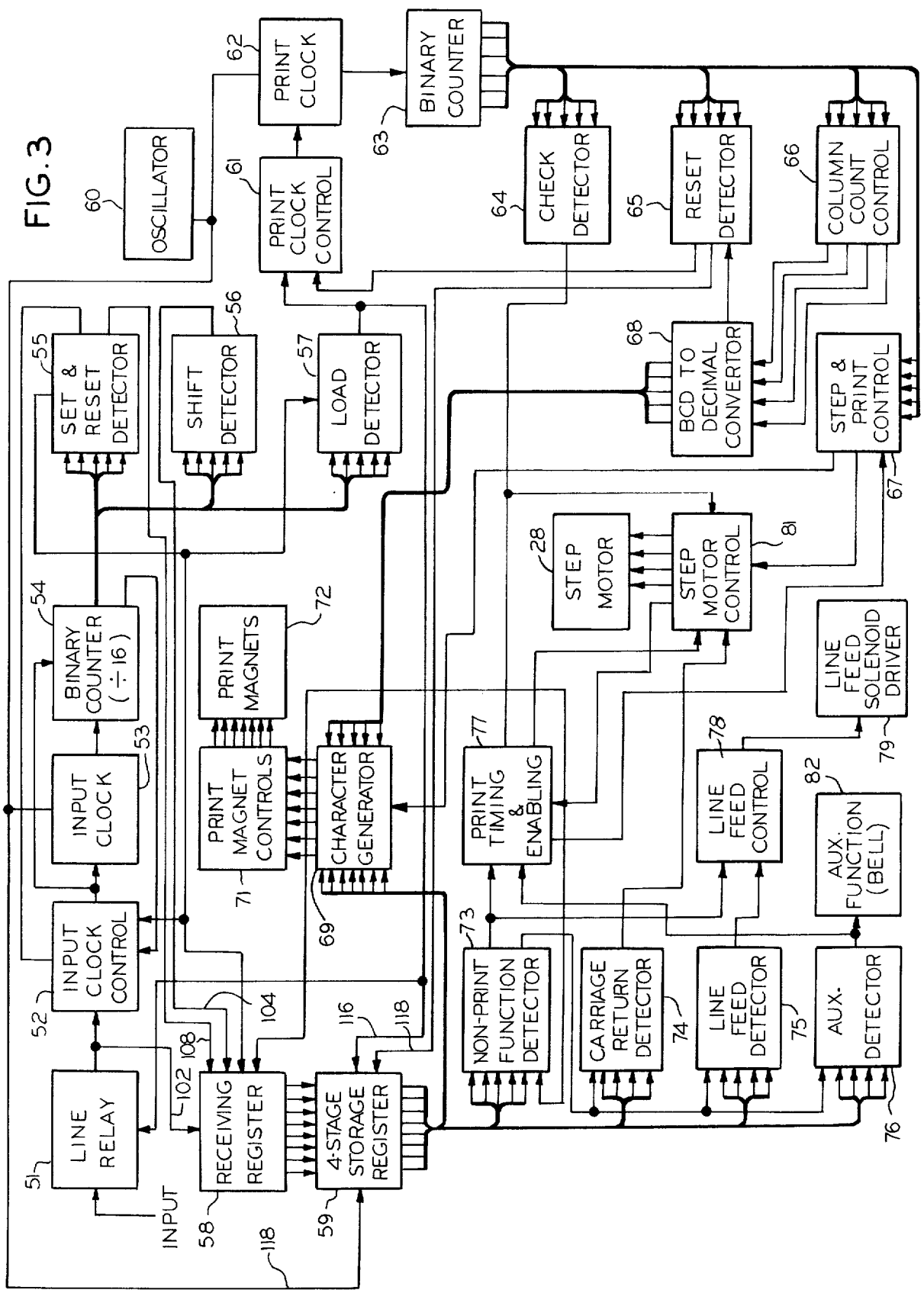
FIG. 3 is a block diagram of a high speed printer control system in which the improvements of the present invention may be incorporated.

FIG. 3 illustrates, in block diagram form, a printer control system 50 taken from the Zenner Fulton patent, with some modification to suit the present invention. The input stage of system 50 is a line relay circuit 51 to which a conventionally coded telegraph signal is supplied. In the following description, and particularly in connection with the circuits illustrated in FIGS. 4–6, it is assumed that the incoming signal is encoded in accordance with the standard eleven-unit ASCII code, but other permutation codes can be employed with appropriate modifications in the control system to interpret the code.

The output of line relay 51 is connected to an input clock control circuit 52. Clock control circuit 52 is in turn coupled to an input clock 53. Clock 53 may comprise a start-stop multivibrator or other oscillator of constant frequency, or may comprise a countdown circuit energized from a separate oscillator 60. The input clock frequency is taken as an integral multiple of the pulse rate of the input signal; for the control described herein, a multiple of sixteen is used. For the ASCII permutation code, which is an eleven-unit code comprising one start pulse, eight data pulses, and two stop pulses, the output frequency for clock 53 is 1760 Hz, assuming an input rate of ten characters per second and a pulse rate of one hundred ten pulses per second.

The output of clock 53 is applied to a binary counter 54. Counter 54 is a sixteen stage counter and thus cycles once for each pulse in the input signal. The final stage of binary counter 54 is connected back to the input clock control circuit 52. The outputs from individual stages in the binary counter are connected to a set and reset detector circuit 55, to a shift detector circuit 56, and to a load detector circuit 57. Though shown as separate circuits, detectors 55–57 may comprise a single BCD-to-decimal decoder capable of developing appropriate set, reset, shift and load signals.

The output of circuit 51 is also connected to a receiving data storage register 58 serving as an initial buffer storage unit for the control system. Receiving register 58, comprising an all-electronic serial-in parallel-out shift register, also receives control signals from the set and reset detector 55 and from the shift detector 56. Another output from the set and reset detector 55 is connected back to the input of clock control circuit 52.

The individual storage circuits in receiving register 58 are connected in parallel to individual storage circuits in the first stage of a four stage operational storage register 59. Register 59 has a shift input connection from the output of oscillator 60. A control input to storage register 59 is supplied from load detector 57. The output of load detector 57 is also connected in a control circuit to line relay 51 and to a print clock control circuit 61.

The output of the print clock control circuit 61 is connected to a print clock 62 which is in turn connected to a binary counter 63. The clock control, clock, and counter circuits 61–63 constitute a print clock means essentially similar to circuits 52–54; indeed, clock 62 is preferably actuated from the same oscillator 60 that supplies input clock 53. However, print clock 62 operates at a different frequency from input clock 53. The operating frequency for print clock 62 is determined by the printing pulse rate for printer 10 and is made equal to an integral multiple of the printing pulse rate. The printing rate is equal to or faster than the incoming signal pulse rate but the print clock frequency may actually be lower because the printer requires only eight pulses per character, as described above in connection with FIG. 2, instead of the eleven pulses per character in the input signal. Thus, the minimum or "normal" frequency for print clock 62 is 1280 Hz. However, print clock 62 must also operate at a substantially higher frequency, as explained more fully hereinafter; it is also capable of producing a "fast" clock signal, in this instance at a frequency of 1564.4432 Hz.

The outputs from the various levels of binary counter 63 are connected to a check signal detector 64, a reset detector 65, a column count control circuit 66, and a step and print control circuit 67. Detector 64 produces a check signal that is applied to receiving register 58 and to a number of other circuits in control system 50. The output of reset detector 65 is connected to the print clock control circuit 61 to reset that circuit at the end of each code word. The column count control circuit 66 has a plurality of output circuits individually connected to the several stages of a BCD-decimal decoder 68. Decoder 68 has a plurality of output circuits individually connected to a character generator 69, and one output connected to reset detector 65.

Character generator 69 has an input circuit connected to an output of the step and print control circuit 67. In addition, character generator 69 has a plurality of input circuits that are connected to the individual stages of the operational storage register 59. Character generator 69, which is a commercially available signal translation matrix of integrated circuit construction, affords seven output circuits, one for each of the printing rods 36 of printer 10 (FIG. 1). Each output of character generator 69 is individually connected to one of seven print magnet control circuits 71. Each print magnet control is in turn connected to an individual magnet or solenoid 72 for actuating one of the print rods 36.

The input signal to system 50 includes a number of codes for printer functions other than the imprinting of individual characters. The occurrence of any of these non-print function codes is identified in a detector 73 having a plurality of inputs connected to the outputs of individual storage circuits in the last or output stage of storage register 59. In addition, separate detector circuits are provided for specific non-print function codes necessary to operation of the printer. These include a carriage return detector 74, a line feed detector 75, and an auxiliary function detector 76. Each of the individual function code detectors 74, 75 and 76 is provided with an input from the non-print function detector 73 as well as a plurality of inputs from the final stage of storage register 59.

One output from the non-print function detector 73 is connected to a print timing and enabling circuit 77 and to a line feed control circuit 78. Circuit 78 has a second input derived from line feed detector 75. The output of the line feed control circuit 78 is connected to a line feed driver circuit 79 for energizing the line feed actuator 34 of the printer (FIG. 1).

The output of the auxiliary function detector 76, FIG. 3, is connected to an auxiliary function circuit 82, which may comprise a buzzer, a bell, or other auxiliary device. The output of detector 76 is also connected to a second input for the print timing and enabling circuit 77. The print timing and enabling circuit 77 has one output that is connected to the step and print control 67. Another output from the enabling circuit 77 is connected to a step motor control circuit 81. Circuit 81 has a second input derived from the output of carriage return detector 74 and a third input taken from the output of check detector circuit 64. The check signal developed in detector 64 is also supplied to the print timing and enabling circuit 77 and to the non-print function detector 73.

The step motor control circuit 81 has four outputs individually connected to four motor windings in step motor 28. Control 81 determines the direction of rotation of step motor 28 and controls the number of steps through which the motor is driven in any given operational sequence.

In considering operation of control system 50, it should be remembered that the initial pulse in each code word, in the ASCII telegraph signal supplied to line relay 51, is a start pulse of given polarity, sometimes referred to as a "space" pulse. The next eight pulses in each code word are data pulses identifying a particular character or a specific printer function; these eight data pulses may be "space" pulses or may be "mark" pulses, which are opposite in polarity to the space pulses. The final two pulses in the code word are stop pulses; both are mark pulses. In the following description it is assumed that the space pulses in the incoming signal are negative-going signals and that the mark pulses are positive-going signals.

OPERATION IN RESPONSE TO A CHARACTER CODE

When a signal transmission to control system 50 is initiated, the first code pulse or baud in the input signal is a space signal pulse which actuates line relay 51, producing an output signal that triggers the input clock control circuit 52 to start input clock 53 in operation. As noted above, clock 53 produces a clock signal at a frequency of sixteen times the pulse rate of the input signal; this clock signal is supplied to binary counter 54. From the frequency relations given above, it can be seen that binary counter 54 produces sixteen output signal pulses during the time interval prior to occurrence of the next pulse in the incoming signal, which may be either a space or a mark pulse, depending upon the character or function code being transmitted.

When counter 54 reaches a count of six, the set and reset detector 55 is actuated, producing a set signal that is supplied back to the input clock control 52 to maintain input clock 53 in operation for the full period of time required for receipt of a given character or other code word. That is, the set signal from circuit 55 maintains the input clock means 52–54 in operation until reset upon receipt of all of the data pulses in a complete code word.

When counter 54 reaches a count of seven, shift detector 56 produces a shift pulse that is supplied to receiving register 58. The shift pulse records the space signal appearing at the output of line relay 51 in the initial storage circuit of receiving register 58. When counter 54 reaches a count of sixteen, indicating completion of one pulse of the input signal, the final stage of counter 54 produces an output signal that is supplied to the input clock 52; 53; at this time, however, this does not alter the operating condition of the input clock control and the input clock 53 continues to run.

During the second cycle of operation of the input clock means 52–54, the second input signal pulse is received in line relay 51. This is the first data pulse; it may be a mark signal or it may be a space signal. At count seven of counter 54, during this first data signal pulse, a shift signal is again supplied to receiving register 58. This shifts the initially recorded space pulse to the second storage circuit in the receiving register and records the present output of line relay 51 in the first storage circuit of receiving register 58. This process continues, with the shift detector 56 producing a shift pulse in each cycle and recording the incoming data from line relay 51 sequentially in the individual storage devices comprising receiving register 58.

When the initial space pulse that started the transmission reaches the final storage circuit of receiving register 58, the receiving register produces an end-of-character signal that is supplied to the set and reset detector 55, to the load detector 57, and to the input clock control 52. This is an enabling signal that conditions the system for subsequent operations.

In the next cycle of the input clock means 52–54, on the count of three in counter 54, a "load" signal is developed by load detector 57. This load signal is supplied to storage register 59 and is utilized to transfer the information that has been recorded in receiving register 58 into the first stage of the operational storage register 59. The transfer of data between registers 58 and 59 is accomplished in a single input clock pulse, the transfer being effected on a parallel basis between individual storage circuits in the two registers. In normal operation, the code word recorded in the initial stage of register 59 is rapidly transferred to the final stage of the register; during a carriage return, the internal transfer within register 59 may be delayed, as explained hereinafter. The load signal is also applied to line relay 51 to reset the line relay to the mark condition to prevent running of the printer on an "open line" condition.

On the count of five in counter 54, after a complete set of data pulses for a code word has been stored in receiving register 58, and transferred to the initial stage of storage register 59, detector 55 develops a reset signal. This reset signal is supplied to input clock control 52 to interrupt operation of input clock 53 until a further code signal is received from line relay 51. The reset signal is also used to clear receiving register 58, recording mark bits in all storage circuits of the receiving register in preparation for recording a new code word. The resetting of register 58 also serves to reset the end-of-character circuits in receiving register 58, so that the enabling signal previously supplied from register 58 to clock control 52 and to detectors 55 and 57 is terminated.

The output signal from load detector 57, in addition to the functions described above, is also supplied to print clock control circuit 61 to initiate operation of print clock 62. Thus, almost immediately after a complete character or function code has been stored in register 59, the print clock 62 is started, affording a clock signal for timing all of the operational control circuits 59–82. The output pulses from print clock 62 are counted in binary counter 63 which, like counter 54, counts in groups of sixteen. On each count of one in the input of binary counter 63, control 66 is actuated to produce a column count signal that is supplied to converter 68 for conversion from binary coded decimal to decimal notation. For each complete character (or function) code, there are eight pulses in the column count signal.

On each count of three in the output of binary counter 63, a "check" signal is produced by detector 64. This check signal is supplied to receiving register 58 to assure resetting of that register to an all "marking" condition. The check signal developed by detector 64 is also supplied to the non-print function detector 73, to the print timing and enabling circuit 77, and to the step motor control circuit 81.

As described above, printer 10 uses a total of eight columns for each character, but the first three columns are utilized for spacing between characters and only the last five columns are actually employed for printing. Consequently, only five output signal connections are provided from the BCD-decimal decoder 68 to character generator 69; the signals from the decoder are employed in the character generator as column strobe signals. The first column signal output from decoder 68 is supplied to column count control 66 for check pulse gating.

Each storage circuit in the output stage of storage register 59 is coupled to an individual input for character generator 69. This information is continuously available to the character generator until new code data is shifted into the final stage of storage register 59 by another load pulse from detector 57. The character generator develops a series of output signals, in response to the column strobe signals from converter 68, that are utilized to actuate the individual print magnets 72 for the print rods 36 of printer 10.

When counter 63 reaches a count of seven, near the mid-point of the counter cycle, circuit 67 is actuated to develop a step signal that is supplied to step motor control 81. This step signal is utilized, in control 81, to develop appropriate drive signals to advance step motor 28 one step. This action occurs once for each of the eight columns entailed in reproduction of a single character. The step and print control 67 also receives a timing signal from the print timing and enabling circuit 77 and develops a "print" pulse timing signal that occurs shortly after the step signal. The print pulse timing signal is supplied to character generator 69 to control timing of energization of the print magnets 72, so that the print magnets are always energized immediately after step motor 28 has advanced one step.

As noted above, character generator 69 is a commercially available integrated circuit matrix suitable for generating actuating signals in response to the code data signals in the final stage of storage register 59, the column count signals from converter 68, and the print signals from control 67. In the reproduction of a single character, only the column count signals for columns four through eight (columns 44–48 in FIG. 2) are supplied to character generator 69. Upon the receipt of one column count signal pulse, character generator 69 (FIG. 3) develops from zero to seven actuating signals, depending upon the particular print magnets that are to be energized for each given column of the character being reproduced. These signals are supplied to the individual print magnets 72, through appropriate drive circuits in the print magnet control 71, reproducing the desired character as described above in connection with FIGS. 1 and 2.

After completion of printing of the character, on the occurrence of a count of twelve in the output of binary counter 63 and with a column eight signal available from converter 68, reset detector 65 is actuated to produce a reset signal that is supplied to print clock control 61. This effectively stops print clock 62, readying control system 50 for printing of another character or for any other function dictated by the next code word received by line relay 51.

OPERATION IN RESPONSE TO A FUNCTION CODE

The initial operation of control system 50 in response to a non-print function code word is basically the same as for a character code word. Thus, the initial space pulse at the beginning of the function code word initiates operation of input clock 53. The code word is stored in receiving register 58, pulse by pulse, in the same manner as described above, under control of the shift signal from detector 56. When all data pulses from the complete code word are stored in receiving register 58, the end-of-character circuits in the receiving register are actuated and initiate the transfer of the complete code data from receiving register 58 to the first stage of storage register 59. In register 59, the code word is rapidly transferred from the first stage to the last or output stage. The load signal from detector 57 that initiates transfer operations between registers 58 and 59 again starts print clock 62 by actuation of control 61. As before, on count five of binary counter 54, a reset signal is generated by detector 55 to condition the input circuits for receipt of a new code word.

With print clock 62 in operation, column count control 66 is again actuated to develop a column count signal comprising eight equally spaced pulses. Moreover, when counter 63 reaches a count of three, check detector 64 again develops a check pulse that is supplied to motor control 81 and to the print timing and enabling circuit 77. The check signal is also applied to the non-print function detector 73, which identifies the code data now stored in register 59 as pertaining to a non-print function rather than to a character to be imprinted. Thus, detector 73 utilizes the check signal from detector 64 and the data signals stored in register 59 to develop a non-print function signal that is supplied to the print timing and enabling circuit 77, to the line feed control 78, and to each of the several different function detectors 74, 75 and 76.

If the data in the final stage of register 59 constitutes the code for a carriage return operation, detector 74 is actuated to develop a carriage return signal that is supplied to step motor control 81. The carriage return signal is utilized by control 81 to initiate a reverse stepping movement of motor 28, where reverse movement of the motor constitutes the mechanical action necessary to begin a carriage return operation in printer 10. In the preferred form of the control system, motor 28 is stepped four steps in the reverse direction to release carriage 18 and allow it to return to the initial line position at the left-hand side of printer 10. In this arrangement, the left-hand margin switch 31 is connected to step motor control 81 to step the motor 28 forward four steps and restore the normal driving conditions for carriage 18 once the carriage has reached its initial position at the left-hand side of the printer.

The selection of the number of reverse steps of motor 28 required to initiate a carriage return movement is subject to substantial variation. Three, five, or even eight steps could be utilized for this purpose if desired. On a practical basis, four steps of reverse movement for motor 28 is adequate and effective in relation to the carriage return operation. It will be recognized, of course, that with a different mechanism for carriage return, the output of carriage return detector 74 could be applied to a separate carriage return device as required.

In the event that the data in storage register 59 represents a line feed code, line feed detector 75 is actuated by the output signal from the non-print function detector 73 and by the data signals from register 59, producing a line feed signal that is supplied to the line feed control 78 together with the non-print function signal from detector 73. Control 78 supplies an actuating signal to the line feed driver circuit 79, energizing actuator 34 and initiating a line feed operation. During the line feed operation, operation of step motor 28 is inhibited.

If the data stored in the final stage of register 59 is a separate auxiliary code for a non-print function, it is detected in auxiliary detector circuit 76. Detector 76 produces an output signal that is supplied to the print timing and enabling circuit 77 to preclude actuation of step motor 28 through control 81. The output signal from auxiliary detector 76 is also supplied to auxiliary function circuit 82 to ring a bell, sound a buzzer or perform such other auxiliary function as may be required.

For each non-print function code, just as for each character code, column count control 66 is operated and supplies the column count signal to converter 68. When the column eight stage of converter 68 is actuated, it produces an output signal that is supplied to reset detector 65. Detector 65 produces a reset signal that is applied to the print clock control 61 to interrupt operation of print clock 62 and thus condition system 50 for the next received code word.

From the foregoing description, it can be seen that each received character or function code is first stored in the buffer register 58 by the distributor circuits comprising the line relay 51, the input clock means 52–54, and detectors 55, 56 and 57. Once all of the data pulses of a complete character or function code word are stored in register 58, the data is transferred from the receiving register to storage register 59. The load signal from detector 57 that initiates the transfer of data between registers 58 and 59 also initiates the next operational phase of system 50, which may be the printing of a character or may comprise some other machine function. During the time that a character is printed or some other machine function is effected, a further character or function code can be received and stored in the buffer store comprising receiving register 58. The overall operating cycle for the printing and function circuits of system 50, controlled by the print clock means 61–63, is somewhat shorter than the data input cycle controlled by the input clock means 52–54. Accordingly, printing of a character of accomplishment of another machine function dictated by data in storage register 59 is accomplished before it is necessary to transfer new data into register 59 from receiving register 58.

CONTROL SYSTEM OF THE INVENTION

Figure 4:
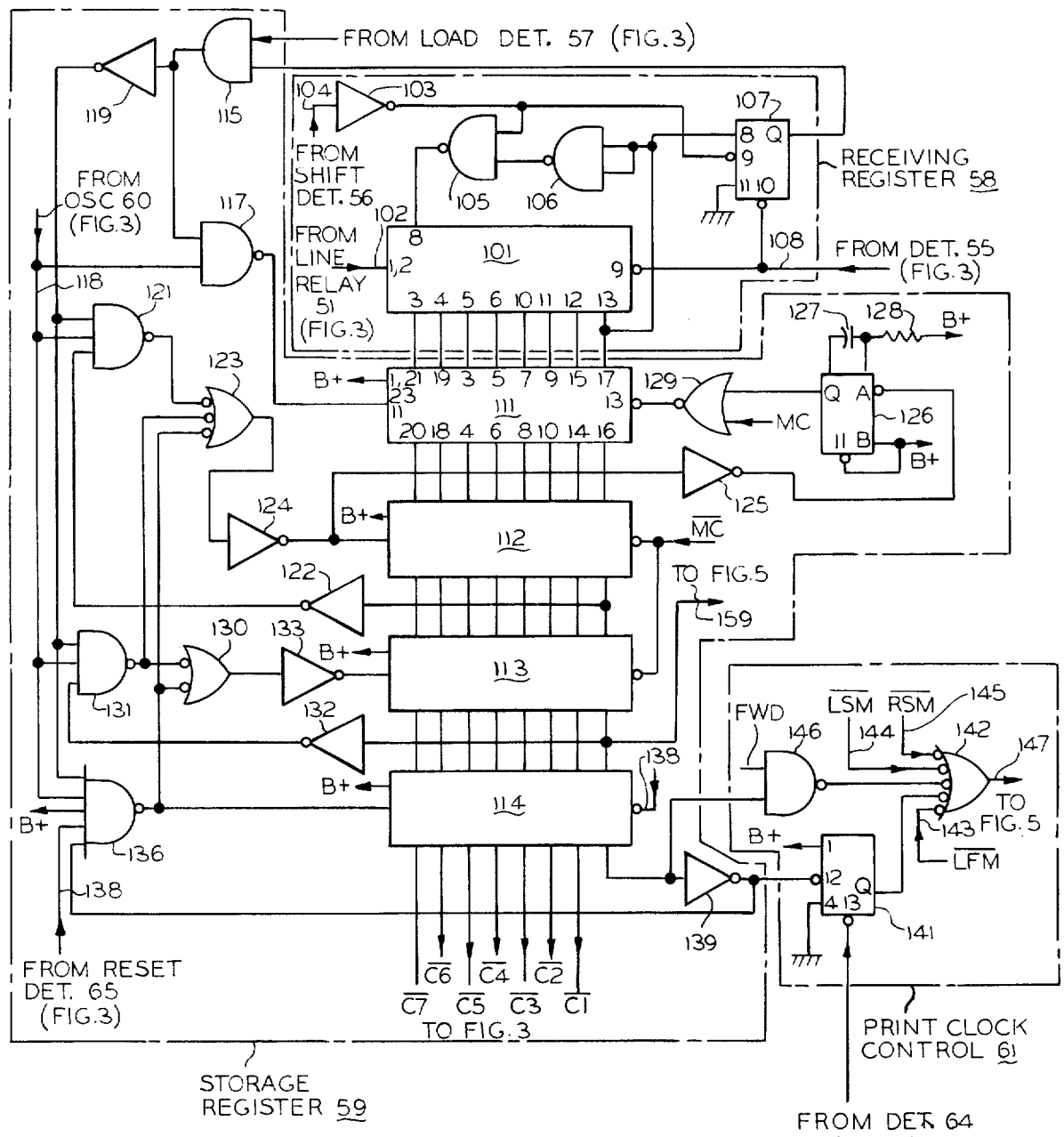
FIG. 4 is a detailed schematic diagram of the storage registers for the control system of FIG. 3 together with a part of the print speed control system of the present invention.

FIGS. 4 and 5, taken in conjunction with FIG. 3, illustrate the operating circuits for an exemplary embodiment of the present invention. The circuits shown in detail in FIGS. 4 and 5 include receiving register 58, storage register 59, print clock control 61, print clock 62, and counter 63.

Receiving register 58, in the specific form illustrated in FIG. 4, comprises an integrated circuit storage device 101 of the serial-in, parallel-out kind having a storage capacity of eight bits. The initial storage circuit in device 101 is connected to an input line 102 that is coupled to the output of line relay 51 (FIG. 3)

The shift circuit for receiving register 58 comprises a conductor 104 connected from shift detector 56 (FIG. 3) to an inverter amplifier 103 (FIG. 4). The output of inverter 103 is connected to one input of an AND circuit 105 that has its output connected to the shift input of storage device 101. The output of inverter 103 is also connected to one input of a flip-flop circuit 107. Flip-flop circuit 107 has a second input derived from the final storage circuit in storage device 101. There is an additional input connection to flip-flop circuit 107 and to storage device 101 from detector 55 (FIG. 3), through line 108. In addition to the connection to flip-flop circuit 107, the final storage circuit in device 101 is connected through an inverter 106 to the second input of AND circuit 105.

Storage register 59, in the construction illustrated in FIG. 4, comprises four individual integrated circuit storage devices 111, 112, 113 and 114 of the parallel-in, parallel-out kind. Each of the storage devices 111–114 has a storage capacity of eight bits. The inputs for the individual storage circuits in device 111 are each connected to the output of one of the individual storage circuits in the storage device 101 of receiving register 58. The output of each storage circuit in device 111 is connected to the input of the corresponding storage level in device 112. The outputs of the storage circuits in device 112 are connected on a one-for-one basis to the inputs of the individual storage circuits in device 113. Similarly, the storage circuits of device 113 are individually connected to the corresponding storage circuits in device 114. The outputs from seven of the individual storage circuits in storage device 114, designated as conductors $\overline{C1}$ through $\overline{C7}$, are electrically connected to the character generator 69 and other operating circuits of control system 50 (FIG. 3).

The logical control circuits for storage register 59 as shown in FIG. 4, include an AND circuit 115 having a first input 116 connected to the output of the load detector 57 (FIG. 3). AND circuit 115 has a second input connected to the output of flip-flop circuit 68 in receiving register 58. The output of AND circuit 115 is connected to one input of an AND gate 117. Gate 117 has a second input which is connected by a conductor 118 to the output of oscillator 60 (FIG. 3). The output of AND gate 117, as shown in FIG. 4, is connected to the shift circuit of the storage device 111.

The output of AND circuit 115 is also connected to the input of an inverting amplifier 119. The output of inverter 119 is connected to one input of an AND gate 121. Gate 121 has a second input that is connected to the oscillator line 118 and a third input that is connected to the eighth and final storage circuit of storage device 112 through an inverter 122. The output of AND gate 121 is connected to one input of an OR circuit 123. The output of OR circuit 123 is connected to the shift circuit of storage device 112 through an inverting amplifier 124.

The output of inverter 124 is also connected to the input of an inverter 125 that is in turn connected to the set input of a flip-flop circuit 126. Flip-flop circuit is connected as a one-shot circuit, being provided with a reset timing circuit comprising a capacitor 127 and a resistor 128 connected to a D.C. supply deisgnated as B+. The output of the one-shot circuit 126 is connected to one input of an OR circuit 129 having its output connected to the reset input of storage device 111. OR circuit 129 also has a second input MC for receiving a "master clear" signal at the beginning of circuit operation.

Storage register 59 further includes an AND circuit 131 having a first input derived from the output of inverter 119. A second input to AND gate 131 is taken from the oscillator line 118. The third input to AND gate 131 is derived from the gate storage circuit of storage device 113 through an inverter 132. The output of AND gate 131 is connected to one input of OR gate 123 and to one input of an additional OR circuit 130. The output of inverter 133 is connected to the shift input of the parallel-in parallel-out storage device 113. Storage device 113 is provided with a reset input circuit $\overline{MC}$ to receive a master clear signal; a similar clearing input $\overline{MC}$ is provided for storage device 112.

Transfer of data from storage device 114 to character generator 69 and to the other circuits of FIG. 3 is controlled by an AND gate 136. AND gate 136 has one input connected to the output of inverter 119. Gate 136 has a second input connected to the oscillator line 118. A third input to AND gate 136 is connected to the B+ supply. AND gate 136 has a fourth input, comprising a conductor 138 which affords a connection from reset detector 65 (FIG. 3) to supply an end-of-character signal to the AND gate. A fifth input to AND gate 136 is derived from the final storage circuit in storage device 114 through an inverter 139.

The output of AND gate 136 is connected to one input of OR gate 123 and to one input of OR gate 130. The output of AND gate 136 is also connected to the data transfer input of storage device 114. The reset input to storage device 114 is connected to the end-of-character circuit 138.

Print clock control 161, as illustrated in FIG. 4, comprises a flip-flop circuit 141 having an input connected to the output of inverter 139 in storage register 59. Flip-flop 141 also has a reset input from check detector 64 in FIG. 3. The output of flip-flop circuit 141 is connected to one input of an OR circuit 142. OR circuit 142 has another input 143 supplying a signal indicative of the occurrence of a line feed operation to the OR circuit. Two additional inputs 144 and 145 to OR circuit 142 supply signals to the OR circuit indicative of the operations of the left-hand switch 31 and the right-hand switch 33 of printer 10 (FIG. 1). A further input to OR circuit 142 is derived from the output of an inverting AND circuit 146. AND circuit 146 has two inputs; one of these inputs is connected to the output of the final storage circuit in device 114, whereas the other receives a signal indicative of operation of the printer carriage in the forward direction.

The output of OR circuit 142 (FIG. 4) is connected to a conductor 147 that leads to the print clock 62 and counter 63 (FIG. 5). In print clock 62, conductor 147 is connected to one input of an inverting AND circuit 148. A second input to AND gate 148 is derived from the oscillator line 118. The output of AND gate 148 is connected to the input of a flip-flop circuit 149 connected to function as a frequency divider with a division factor of two. The output of frequency divider 149 is connected to an additional similar divide-by-two frequency divider, the flip-flop 151.

The output of frequency divider 151 is connected to the input of an integrated circuit counter device 152 having its outputs connected in a logical circuit arranged to function as a frequency division factor of nine or eleven. Device 152 is a four-stage sequential counter having four outputs 171 ($\div 2$), 172 ($\div 4$), 173 ($\div 8$) and 174 ($\div 16$). The count for division by nine is established by an AND circuit 153 having two inputs individually connected to outputs 171 and 174 of counter 152. The output of AND gate 153 is applied to an inverting amplifier 154. The output of amplifier 154 is connected to one input of an AND circuit 155 and to one input of another AND circuit 156. AND gate 155 has a second input derived directly from another output 172 of counter 152. AND gate 155 is utilized to derive a count indicative of division by eleven. The output of AND gate 155 is connected to one input of an OR circuit 157.

The second input to AND gate 156 is derived from the output of an OR circuit 158. OR circuit 158 has two inputs. The first of these inputs is connected to a conductor 159 that is connected to the final stage of storage device 113 in storage register 59 (FIG. 4) and supplies a signal to OR gate 158 that indicates storage of a data word in device 113. The alternate input to OR gate 158, FIG. 5, is a carriage return signal derived from the carriage return detector 74 (FIG. 3). The output of AND gate 156 is connected to a second input for OR circuit 157.

The output of OR gate 157 in print clock 62 (FIG. 5) is connected to the input of an inverter 161 which is connected, in turn, to the input of a one-shot multivibrator 162. The output of multivibrator 162 is connected to one input of AND gate 163. AND gate 163 has a second input derived from the output of print clock control 61, conductor 147. The output of AND gate 163 affords a reset signal that is supplied to the reset inputs of the two frequency-divider flip-flops 149 and 151 and that is also supplied, through an inverter 164, to the reset input of counter register 152.

Counter 63, in the form shown in FIG. 5, comprises a conventional integrated circuit counter register 165. The count input to device 165 is taken from output 174 of device 152 in print clock 62. A reset input is provided for device 165, through an inverter 166 having its input connected to the output conductor 147 from print clock control 61 (FIG. 4).

OPERATION OF THE INVENTION (FIGS. 3–5)

Each received code word, whether for a character to be printed or for a non-print function, is initially recorded in serial manner in device 101 of receiving register 58. When a complete code word is recorded, a signal is supplied from the final recording stage of device 101 to flip-flop 107 to develop an enabling signal for AND gate 115. The oscillator input to AND gate 115 actuates the gate and applies an enabling signal to AND gate 117 to actuate the transfer circuit of storage device 111 on the next cycle of operation of oscillator 60, transferring the recorded code word to device 111. Devices 101 and 107 are reset by a reset signal from detector 55.

If the next storage device 112 in register 59 is clear, an enabling signal is supplied to gate 121 from inverter 122. Under these circumstances, the data recorded in device 111 is transferred to device 112 on the next cycle of the oscillator signal, since an enabling input is already available from AND gate 115. In the same manner, the data is transferred to storage device 113 in the next oscillator cycle if device 113 is clear, as indicated by the signal to AND gate 131 from inverter 132. On the next cycle of oscillator 60, the code word is transferred to storage device 114, provided device 114 is clear as signalled to AND gate 136 by the output of inverter 139 and an enabling signal indicating completion of the prior print or other function is available from reset detector 65.

During a carriage return operation, device 114 is not cleared in the usual time; a code word recorded therein may be held in storage for several machine cycles as described hereinafter. When this occurs, further data cannot be recorded in device 114. A succeeding received code word can then progress through register 59 only as far as device 113. Whenever device 113 contains recorded data, transfer of further data thereto is inhibited and the next received code word is stored in device 112. With device 112 filled, any received code word remains recorded in device 111. The capacity of register 59 has been selected to afford adequate storage for the longest printer function requiring retention of data for future use, ordinarily the carriage return function. Additional stages for register 59 can be employed if a longer storage time proves necessary.

In considering the operation of the control system of FIGS. 3, 4, and 5, the characteristics of the incoming telegraph signal supplied to line relay 51 impose some requirements with respect to frequencies and related factors. Initially, it may be assumed that the input signal is in the ASCII eleven-unit code with a receiving rate of 110 bauds. For this signal, the receiving rate is ten characters per second, so that each code word representative of a character or of a non-print function is received in a time interval of 100 hundred milliseconds. For this eleven-unit code, therefore, the time interval for each received unit (bit) is 9.0909 milliseconds. For the illustrated operating circuits, with this ASCII input signal, and particularly for the print clock 62 and counter 63 constructions shown in FIG. 5, oscillator 60 is constructed to operate at a frequency equal to the baud rate multiplied by a factor of 512, so that the oscillator frequency is 56320 Hz. A crystal-controlled oscillator constructed for this frequency is preferably utilized.

Print clock 62 and counter 63 comprise two different countdown means arranged to provide for different print signals that control printing at two different rates. A slow rate matched to the incoming character rate for the signal supplied to line relay 51 (FIG. 3) is afforded for periods of operation in which there is no necessity for prolonged storage of information in the first three stages 111–113 of the store 59 (FIG. 4). Inasmuch as each character requires eight columns, the ten character per second rate for the received signal imposes a requirement of a rate of eighty columns per second in the printer operation to achieve a line-matched rate. When data has been held stored in the first three stages of register 59, as during a carriage return operation, a higher print rate is employed, as described hereinafter.

FIG. 6 affords a series of charts indicative of the outputs of various components of print clock 62. In FIG. 6, the output signal from flip-flop circuit 151 is represented by the pulse signal 200. This signal, which has a frequency equal to the oscillator frequency divided by a factor of our has a pulse rate of 14080 Hz. This is the input signal that is applied to counter 152.

The first output 171 of counter 152 has a signal frequency of one-half that of the input signal 200 to the counter, as represented in FIG. 6 by the pulse signal 201. The output signal 202 from the next stage 172 of counter 152 is at one half the frequency of signal 201. The pulse output appearing at output circuit 173 is again at one-half the frequency of the preceding signal, and is represented by curve 203. The final output 174 of counter 152 comprises a signal 204 having a frequency of only one-sixteenth of the input signal 200.

AND gate 153 receives two inputs from counter 152, comprising the signals 201 and 204. Accordingly, AND gate 153 produces a pulse 205 at the end of the ninth input pulse to counter 152, the ninth pulse in signal 200. It is thus seen that the output from AND gate 153, which is supplied to AND gate 156 through inverter 154, represents a division of the input frequency by a factor of nine. Signal 205 is a high speed signal that is utilized only when a code word has been stored and remains in the third stage 113 of storage register 59, as signalled to print clock 62 by an input signal to OR gate 158, through circuit 159, or by a carriage return signal recognized by the carriage return detector 74 (FIG. 3). Under either of these circumstances, AND gate 156 is enabled and supplies a reset signal to print clock 62, through circuits 157, 161, 162, 163 and 164, resetting the entire print clock on each ninth count of the output signal from flip-flop circuit 151.

For these operating conditions, the effective frequency of the print signals from counter 63 reflects division by a factor of two in circuit 159, by a factor of two in circuit 151, by a factor of nine in counter 152 and AND gate 153, and by a factor of sixteen in counter 165. This affords a fast print rate of 97.777 columns per second corresponding to 12.222 characters per second. When the print rate is controlled by AND gates 153 and 156, printing is effected at a fast rate corresponding to 1.222 times the line rate, and each character is printed in a time equal to 81.81% of the time required to supply a complete new character to the system through line relay 51.

The nine-count output signal 205 from AND gate 153 is also supplied to one input of AND gate 155. The other input of AND gate 155 is the output signal 202 from counter output circuit 172. The resulting output signal 206 from AND gate 155 (FIG. 6) coincides with the completion of the eleventh input pulse to counter 152. Accordingly, signal 206 from AND gate 155 represents a division of the input frequency by a factor of eleven. Signal 206 controls the print rate whenever there is no code word stored in the third stage 113 storage register 59 and no carriage return signal has been identified. The output signal from AND gate 155 is applied to the reset circuits to reset print clock 62 on each eleventh count of the output signal from flip-flop circuit 151.

For these operating conditions, the effective frequency of the print signals from counter 63 reflects division of the oscillator frequency by a factor of two in circuit 149, by a factor of two in circuit 151, by a factor of eleven in counter 152 and AND gates 153 and 155, and by a factor of sixteen in counter 165. This affords a slow or normal print rate of eighty columns per second corresponding to ten characters per second, the same rate as the input signal supplied to the printer line relay 51 (FIG. 3). For these conditions, therefore, with the print rate controlled by AND gate 155, printing is effected at a normal rate corresponding to the incoming line rate.

From the foregoing discussion, it is seen that print clock 62 and counter 63, conjointly, afford countdown means utilizing the signal from oscillator 60 to develop both a fast print rate signal and a normal print rate signal. For the normal print rate signal, matched to the incoming line rate, the frequency for the ASCII eleven-unit code referred to above is $f/n$, where $f$ is the oscillator frequency of 56.32 KHz and $n = 2 \times 2 \times 11 \times 16 = 704$, giving a print rate of eighty columns per second. The fast print rate signal has a frequency of $f/m$, where $m = 2 \times 2 \times 9 \times 16 = 576$, affording a print rate of 97.777 columns per second.

The overall effect of the dual-rate print control of FIGS. 4 and 5, and the effect on the total operation of the printer, can best be understood by reference to FIGS. 7A–7C, in which the dual-rate operation is compared with single-rate operation. FIG. 7A affords a series of charts illustrating the timing of data storage and printing operations, including a carriage return, for a single-rate printer of the kind described in the aforementioned patent of John R. Fulton and Walter J. Zenner, U.S. Pat. No. 3,719,781. A direct comparison is possible because the overall control system is essentially similar to FIG. 3 of the present application except that in the patent only a single print rate timing signal is available; from the print clock 62 and counter 63.

In FIG. 7A, the load signal from detector 57, supplied to storage register 59 over line 116 (FIG. 3), is indicated by the pulse signal 209, to which the identifying letters A through U have been applied to indicate successive characters transferred to storage register 59 from receiving register 58. The second level 211 of FIG. 7A indicates the operating condition for the first storage device 111 in register 59. The next level 212 of FIG. 7A identifies the storage condition for stage 112 of storage register 59 and the next level 213 illustrates storage conditions for device 113 in the storage register. Operating conditions for the fourth and final storage device 114 of storage register 59 are shown by level 214 in FIG. 7A. Line 215 in FIG. 7A indicates the carriage return operation. Line 216 illustrates the timing of the printing mechanism, whereas line 217 shows the timing for the line feed operation in the printer.

In the first cycle of operation as shown in FIG. 7A, the code word for the character A is transferred by the load signal 209 to the first storage device 111 in storage register 59. With no carriage return operation in effect, and with the received signal constituting a character code, the code word representative of the character A is rapidly transferred through storage devices 112 and 113 to device 114 as described above. The transfer from the receiving register, indicated by the load signal 209, to the final stage 114 of the operational storage register 59 occurs in just four cycles of oscillator 60; since the oscillator rate, as noted above, is 56.32 KHz, it is seen that the transfer to the final level of the storage register is virtually instantaneous.

The code word representative of the character A is retained in storage in stage 114 for a time interval sufficient to permit printer 10 (FIG. 1) to reproduce the complete character. As indicated by the first cycle of print signal 216, FIG. 7A, printing of the character A is accomplished in a time slightly shorter than that required for the receipt of a new code character, as indicated by the interval between pulses of load signal 209. That is, the complete character A is printed during the initial time interval 218 of print signal 216, leaving a brief gap 219 before the next code character reaches storage level 114 and its printing is initiated.

The printing of the second character B, for the single rate system, as shown in FIG. 7A, proceeds in the same manner as described above with respect to the first character A. The code word representative of the character B is rapidly transferred from the receiving register 58, by load signal 209, through storage devices 111, 112, and 113 to device 114. This code word is retained in storage in level 114 of register 59 for a time interval sufficient to complete printing of the character.

For the conditions illustrated in FIG. 7A, the right-hand switch 33 is actuated during the printing of the character B at the time RS, thereby initiating a carriage return cycle. The actual carriage return movement, indicated by pulse 221, is commenced immediately upon completion of printing of the character B. In any event, the carriage return operation is initiated prior to the receipt of the next code word, indicated to be representative of the letter C.

The code word for the letter C is transferred to storage device 111 by load signal 209 and is immediately transferred through levels 112 and 113 to level 114. At this time, however, the character C cannot be printed because the carriage must be returned to a position to begin a new line of type. Consequently, the code word C is retained in storage level 114 for a substantial time interval, in this instance equal to four cycles of the incoming telegraphic signal. The next character code word, the letter D, is transferred rapidly from the receiving register to storage level 111 and through storage 112 to storage level 113. The code word D cannot be transferred to the final storage level 114 because the code word C is already stored therein. Consequently, the code word D is retained in storage in device 113.

The next code word E is supplied to storage register 59 in the same manner as described above but is retained in storage in device 112 because the succeeding levels in the storage register are already full. The succeeding code word F is stored in the first level 111 of the storage register on the next cycle of the incoming signal.

The carriage return operation is terminated by actuation of the left-hand switch 31 (FIG. 1), indicated in FIG. 7A at time LS. During the carriage return interval, a line feed operation may be effected as indicated by pulse 222 in line 217 of FIG. 7A. A reversal in direction of movement of the carriage is effected by the carriage return control, as indicated by pulse 223 in line 215 of FIG. 7A, and printing operation is resumed at the end of pulse 223.

The first character to be printed, when printing has been resumed, is the character C that has been stored in device 114 of register 59. The print clock, the timing of which is indicated by line 216 in FIG. 7A, is operated somewhat faster than the received signal, so that printing of the character C is completed by the time that the input signal is ready to supply a new character G to the control system. When the character C has been printed, the data recorded in levels 111–114 of storage register 59 is transferred through the storage register and printing of the next character D is initiated. Character D is printed before the next character H is ready in the receiving register and available for transfer to level 111 in the operational register. Thus, a short time gap is developed in which storage level 111 is clear, between the characters G and H. This operation goes forward progressively, with the printing proceeding at a rate slightly faster than the receipt of incoming data.

By the time the character N is ready for storage in level 111, the next level 112 is already clear and its character can be transferred almost instantaneously to level 112. The same condition proceeds for the succeeding storage levels in register 59 so that, when the character U is reached, it can be transferred with no delay to the third storage level 113. The clearing operation for the several levels of storage register 59 goes forward until a point is reached at which each incoming code word can be transferred instantaneously to the final level 114 of the main storage register, again producing the operational conditions illustrated at the left-hand side of FIG. 7A.

For the operation illustrated in FIG. 7A, with a single-rate print clock running only slightly faster than the received signal, it is obvious that a considerable period of time is required to empty storage register 59. If a carriage return signal is received during this time interval, there is insufficient capacity to store the code words necessary to retain all of the received information through the period of time T1 required for carriage return and line feed operations. The result, at best, is the loss of some of the information; at worst, operation may be confused and unintelligible for some period of time.

FIG. 7B illustrates operating conditions for the same single-rate control system as that discussed above with respect to FIG. 7A except that the print clock has now been accelerated to afford a print interval that is substantially shorter in comparison to the time interval for receipt of a new code word. As illustrated in FIG. 7B, by running the print clock faster, the storage devices 111–114 are emptied more quickly. This allows a greater time interval T2 for completion of the carriage return and line feed functions. Now, however, it is seen that when printing has caught up with the data storage operation, and the first three levels of the operational storage register are maintained essentially empty, there are relatively large time intervals 224 between the individual printing cycles. This results in a start-stop motion of the carriage of the printer, which may cause severe vibration and bouncing of the carriage and may reduce the quality of the printed copy to an unacceptable level. Moreover, the start-stop motion may produce a resonance in the mechanical components of the printer that can also result in unintelligible printing.

FIG. 7C illustrates the operation of the control system of the present invention, with the same load signal frequency as shown in FIG. 7A. At the outset, an initial code word A is supplied to level 111 of the operational storage register. This code word is rapidly transferred through storage devices 112 and 113 and is retained in storage level 114 for a time interval approximately equal to the incoming code word rate. The printing of the initial character, represented by the shaded pulse 225 in the final print line of FIG. 7C, is carried out at a relatively slow rate matched to the incoming character rate, the print rate being controlled by the eleven-count signal from AND circuit 155 (FIG. 5). Consequently, when the next code word B is supplied to storage device 111, it can be rapidly transferred through the operational storage register to device 114. The printing operation goes forward continuously, as indicated by pulse 226, and printing of the character B occurs in the time interval necessary for receipt of the succeeding code word C.

As in the case of the single-rate system described in connection with FIG. 7A, the dual rate operation shown in FIG. 7C includes the initiation of a character return by actuation of the right hand margin switch at the time RS, during or approximately coincident with the completion of printing of the character B (pulse 226). As a consequence the next code word C cannot be printed and must be retained in storage device 114 of storage register 59. Pulse 227 indicates the initiation of the carriage return operation. The succeeding code words D, E and F received during the carriage return and line feed interal T3 are also placed in storage in devices 113, 112 and 111 respectively.

On its return movement, the printer carriage engages the left-hand switch 31 (FIG. 1) and initiates a control operation that returns the printer to forward movement of the carriage; the reversal of the carriage movement is indicated by pulse 228 in the carriage return line of FIG. 7C. Upon completion of the carriage return cycle, printing is resumed. However, the print rate is now established at the higher frequency controlled by the nine-count signal supplied to AND gate 156 in print clock 62 (FIG. 5). Thus, the printer is able to print the character C from storage level 114 in a time interval, indicated by pulse 229, that is substantially shorter than the time required for receipt of a new code word from the incoming signal. Specifically, for the ASCII code discussed above, character C is imprinted in a time interval equal to 81.81% of the period required for recording a further code word in the receiving register of the printer mechanism.

As long as any code word is stored in the next to last level 113 of storage register 59 (FIG. 4), AND gate 156 (FIG. 5) is maintained enabled by the signal supplied thereto through OR gate 158. Thus, the succeeding characters D, E, F, G and H (FIG. 7C) are all printed at the high speed rate of 97.777 columns per second, a rate equal to 12.222 characters per second. As noted above, this is equal to 1.222 times the line rate at which information is received by the printer, and empties operational storage register 59 at a relatively rapid rate.

Code word I is also printed at the high speed rate, as shown in FIG. 7C, since storage device 113 remains filled for virtually the complete time required for printing of this particular character. When code word J is transferred to storage device 114, however, there is a brief time interval 231 during which storage device 113 is cleared and has not yet received the next code word K. As a consequence, imprinting of character J is initiated at the normal rate, matched to the incoming line rate, determined by the output of AND gate 155 (FIG. 5), as indicated in FIG. 7C by the shaded interval 232 in the print line. During the time interval that character J is being printed however, the next code word K is received and is transferred into and held in storage in device 113. As soon as this occurs, the print rate is again accelerated so that the remainder of character J is imprinted at high speed, as indicated by interval 233 in the print line of FIG. 7C.

After character J has been printed and the next code word K is transferred to storage device 114, printing again proceeds at the normal rate because storage device 113 is initially empty. While printing of character K is in progress, the next code word L is recorded and stored in device 113, so that the terminal portion of character K is printed at high speed. This process is repeated for the printing of code words L and M, with the time interval for high speed operation progressively reducing as the printing operation catches up with the data storage operation. By the time that the character N is reached for printing, the first three storage devices 111–113 are maintained cleared throughout the printing operation and printing goes forward thereafter at a rate synchronized with the incoming data.

From the timing chart provided in FIG. 7, it can be seen that high speed printing is maintained by the control system of the present invention whenever the next to last storage device 113 of register 59 contains a recorded code word. On the other hand, whenever device 113 does not contain recorded data, printing is effected at the normal rate matched to the incoming line rate. Because the final stage of frequency division in the print clockcounter combination 62–63 occurs after the circuits which effect the choice of print rate, the printing operation is essentially continuous. As shown by the print line in FIG. 7C, there are no appreciable time intervals between the individual character printing operations, a result made possible by printing some of the characters at both the normal rate and the high rate. In this manner, the vibration and resonance problem presented in a single-rate printing operation (FIG. 7B) are effectively eliminated. Moreover, the storage capacity difficulties which occur in the slower single-rate example of FIG. 7A are wholly eliminated in the dual-rate operation afforded by the present invention and illustrated in FIG. 7C.

The overall result of the control system of the invention thus affords an averaging effect that provides a truly variable printing speed ranging from a value substantially exceeding the signal line rate to a speed that matches the line rate whenever storage register 59 is emptied in the course of each printing operation.

Of course, the present invention is not limited to the specific ASCII eleven-unit code and the operating frequencies set forth above. For example, the system can be applied with only limited modifications to a received signal in a 7.5 unit Baudot code having a baud rate of 50 per second and thus affording a time interval of 20 milliseconds per unit and 150 milliseconds per character. For such a signal, the character rate is 6.666 characters per second. For this signal, an oscillator frequency of 25.6 khz can be conveniently established, being determined as the baud rate multiplied by a factor of 512 as in the previous example. Krz To meet the requirements for the normal printing speed, and to match the normal printing speed to the incoming data rate, the output of print counter 63 is established at 53.33328 columns per second, determined as the product of eight columns per character times the line rate of 6.6666 characters per second. This print rate is established by dividing the oscillator frequency of 25.6 KHz by factors of two, fifteen, and sixteen. That is, for the normal speed $f/n$, $n$ is determined as 480. The initial division by a factor of two is accomplished in one of the flip-flop circuits 149 and 151 of FIG. 5, bypassing the other flip-flop circuit. Division by fifteen is accomplished by using counter 152, as before, but employing an appropriate AND gate connected to all of the outputs 171–174 of counter 152 to afford an output pulse occurring on the fifteenth count as indicated by pulse 241 in FIG. 6.

For this particular code, a suitable rapid print rate can be established by dividing the oscillator frequency by factors of two, twelve, and sixteen. Thus, the fast print rate $f/m$ can be established with $m$ equal to 384. To achieve the requisite division by twelve, using counter 152, an appropriate AND gate can be connected to outputs 171, 173, and 174 of the counter, with the signal from output 171 inverted, to afford a count-twelve signal as illustrated by pulse 242 in FIG. 6. This establishes a print rate of 66.666 columns per second, a rate that exceeds the incoming line rate for new data by twenty-five percent. Thus, on the high speed operation printing is effected in 80% of the time required to receive a new code word.

The specific examples presented above are for only moderately high speed operation. For even more rapid transmission and printing systems, however, the control of the present invention is readily adaptable to provide a smooth and truly variable print rate matched to the overall printer requirements simply by appropriate selection of the oscillator frequency $f$ and the division factors $n$ and $m$ that determine the normal and fast print rates respectively. Of course, selection of some of the components for the control are dependent upon the operating characteristics of the printer. If the carriage return operation requires a time interval equal to that during which six new code words are received, the capacity of storage register 59 must be increased to a total of six or possibly seven stages instead of the four stages illustrated. The basic control arrangement, however, can be readily and effectively applied to virtually any form of permutation code signal transmission and any desired transmission rate.

In any system incorporating the invention, the values selected for the oscillator frequency $f$, the factor $m$ that determines the fast print signal frequency, and the factor $n$ that determines the normal print rate depend to some extent on the capabilities of printer 10 and the number of stages employed in the operational storage register 59. For $x$ stages of storage, the relationship between factors $m$ and $n$ should be in the range from at least $$n = m\left(1 + \frac{1}{x-1}\right)$$

to about $$n = m \left(1 + \frac{1}{x}\right).$$

This allows rapid recovery of the data from storage in register 59 without accelerating printer 10 to operation at an unnecessarily high rate.

In the specific embodiment of the invention illustrated in FIGS. 3–5 and described above, storage register 59 is of the shift register type, in which each code word is shifted through the register from the input stage 111 to the output stage 114. Furthermore, the timing of the storage register operation is such that, when there is an accumulation of more than one code word in the storage register, the transfer of recorded data to the output stage 114 occurs at the beginning of an operating cycle for the printer, during the initial portion of the first column movement. However, it should be understood that the invention is not limited to use of this particular form of storage register nor this specific timing in its operation.

Thus, the timing of the shifting of data within a shift register store, such as storage register 59, can readily be modified to transfer a new code word from the penultimate stage 113 to the output stage 114 during the last column movement period of each printer cycle. For the illustrated embodiment, this would be the eighth column movement period. If this timing arrangement (disclosed in greater detail in application Ser. No. 528,447) is adopted for the input data store, selection of the fast print rate signal or the normal print rate signal may be effected by monitoring the output stage 114 of the storage register, at the appropriate time in the preceding print cycle. That is, with this change the print rate selection means for selection of the print rate signal to be applied to the print head drive in the printer is effected in accordance with the presence or absence of a code word recorded in the output stage of the storage register. The basic operation of the print rate control remains the same.

In some printers, a random access memory is utilized as a data input store instead of the shift register memory described above. However, the RAM still functions as a first-in first-out (FIFO) storage device. In a printer control system of this kind, the storage-monitoring output connection from the storage register to the print rate selection means, corresponding to circuit 159 in the embodiment of FIGS. 3–5, must switch from stage to stage in the storage register in accordance with the recording sequence therein, in the same manner as the switching of the output connections from the storage register that supply data signals to the printer. In all other respects, however, the construction and operation of the print rate control system of the invention may remain essentially unchanged.

In some high-speed printers, accumulation of a substantial number of code words may be permitted, in the data input storage register, before a change is made from the normal printing speed to the fast print rate. This may be done in order to minimize speed changes in operation of the printer. For example, in a multistage storage register, the accumulation of as many as ten or twenty code words in the storage register may be permitted before the print rate selection means is actuated to select the fast print rate signal and thus operate the printer at its higher speed. On the other hand, the change back to the normal print rate may be delayed until the storage register is almost or completely cleared, again for the purpose of minimizing the number of changes between the different print rates for the printer. In all instances, however, the stage or stages of the storage register that are monitored for the presence or absence of recorded code words should allow some additional storage capacity, ahead of the monitored stage, to allow for the accumulation of additional data and thereby avoid the loss of any data due to failure to change soon enough to the fast print rate.

I claim:

1. An electronic print rate control system for a high-speed column-sequential dot matrix printer actuated in accordance with a permutation code signal of given pulse rate in which each code word, representative of a character to be reproduced or of a non-print function, includes a given number of data pulses, the printer comprising a print head, print head drive means for stepping the print head through a plurality of column movements in each spacing character cycle, a print timing oscillator having an operating frequency $f$ much higher than the pulse rate of said permutation code signal, a plural-stage FIFO storage register, each stage having a capacity sufficient to record a code word, means for recording each code word in the storage register, and means for reading out the code words from the storage register in the same order as received, the print rate control system comprising:

first countdown means, coupled to the print timing oscillator, for developing a normal print rate signal having a frequency $f/n$;

second countdown means, coupled to the print timing oscillator, for developing a fast print rate signal having a frequency $f/m$, where $n$ and $m$ are integers and $n > m$;

and print rate selection means for selectively applying one of the print rate signals to the print head drive means to control the rate of column movements, in each spacing character cycle, in accordance with the presence or absence of a code word recorded in a given stage of the storage register.

2. An electronic print rate control system for a column-sequential dot matrix printer, according to claim 1, in which said storage register is a sequential shift register which includes an input stage, a plurality of intermediate stages, and an output stage, and in which said print rate selection means selects the print rate signal in accordance with the presence or absence of a code word recorded in the intermediate stage immediately preceding said output stage.

3. An electronic print rate control system for a column-sequential dot matrix printer, according to claim 1, in which each of said countdown means comprises a plurality of series-connected countdown stages, including an adjustable countdown stage, common to both countdown means, that is actuatable between first and second different integral countdown factors to provide said normal and fast print signals, respectively.

4. An electronic print rate control system for a column-sequential dot matrix printer, according to claim 3, in which said adjustable countdown stage comprises a digital counter having successive individual outputs affording signals with countdown factors of increasing multiples of two, a first reset circuit for resetting said counter on a given count to generate said normal print signal, and a second reset circuit for resetting said counter on a given smaller count to generate said fast print signal.

5. An electronic print rate control system for a column-sequential dot matrix printer, according to claim 4, in which said print rate selection means comprises an AND gate, incorporated in series in said second reset circuit, and means for applying an enabling signal to said AND gate whenever a code word is stored in said given stage of said storage register.

6. An electronic print rate control system for a column-sequential dot matrix printer, according to claim 1, in which the relationship between the normal and fast print rate signals, for a total number of $x$ stages in the operational storage register, is in the range between $$n = m \left(1 + \frac{1}{x-1}\right)$$

and $$n = m \left(1 + \frac{1}{x}\right).$$

7. An electronic print rate control system for a column-sequential dot matrix printer, according to claim 1, in which said oscillator frequency $f$ is integral multiple of the pulse rate of said permutation code signal.

8. An electronic print rate control system for a column-sequential dot matrix printer, according to claim 1, in which the print rate selection means is coupled to the output stage of the storage register and selects the print rate control signal in accordance with the presence or absence of a code word in the output stage of the storage register.

9. An electronic print rate control system for a column-sequential dot matrix printer, according to claim 1, in which the print rate selection means is coupled to the output stage of the storage register and selects the print rate control signal for a spacing character cycle in accordance with the presence or absence of a code word in the output stage of the storage register at a predetermined time within the last column movement period of the immediately preceding cycle.

10. An electronic print rate control system for a high-speed column-sequential dot matrix printer actuated in accordance with a permutation code signal of given pulse rate in which each code word, representative of a character to be reproduced or of a non-print function, includes a given number of data pulses, the printer comprising a print head, print head drive means for stepping the print head through a plurality of column movements in each spacing character cycle, a plural-stage FIFO storage register, each stage having a capacity sufficient to record a code word, means for recording each code word in the storage register, and means for reading out the code words from the storage register in the same order as received, the print rate control system comprising:

means for generating a normal print rate signal of fixed frequency to actuate said printer to reproduce characters at a normal print rate approximately equal to the rate of receipt of code words;

means for generating a fast print rate signal of mixed frequency to actuate said printer to reproduce characters at a fast print rate, substantially faster than said normal print rate;

and print rate selection means for selectively applying one of the print rate signals to the print head drive means to control the rate of column movements, in each spacing character cycle, in accordance with the presence or absence of a code word recorded in a given stage of the storage register.

11. An electronic print rate control system for a column-sequential dot matrix printer, according to claim 10, in which the print rate selection means is coupled to an intermediate stage of the storage register, preceding the output stage, and selects the print rate control signal in accordance with the presence or absence of a code word recorded in such intermediate stage.

12. An electronic print rate control system for a column-sequential dot matrix printer, according to claim 10, in which the print rate selection means is coupled to the output stage of the storage register, and selects the print rate control signal in accordance with the presence or absence of a code word recorded in such output stage at a predetermined time within the last column movement period of the immediately preceding cycle of the printer.

13. An electronic print rate control system for a column-sequential dot matrix printer according to claim 10 in which said storage register includes $x$ stages and in which the fast print rate signal has a frequency of about $1+(1x)$ times the frequency of the normal print rate signal.

* * * * *